United States Patent
Vinton

(10) Patent No.: US 9,725,109 B2
(45) Date of Patent: Aug. 8, 2017

(54) STEERING COLUMN WITH DECOUPLING J-SLIDER

(71) Applicant: Ford Global Technologies, LLC, Dearborn, MI (US)

(72) Inventor: Jeff Steven Vinton, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/936,284

(22) Filed: Nov. 9, 2015

(65) Prior Publication Data

US 2017/0129530 A1     May 11, 2017

(51) Int. Cl.
*B62D 1/19* (2006.01)
*F16D 9/06* (2006.01)

(52) U.S. Cl.
CPC .............. *B62D 1/192* (2013.01); *F16D 9/06* (2013.01)

(58) Field of Classification Search
CPC .......... B62D 1/192; B62D 1/197; B62D 1/19; B62D 1/18; B62D 1/20; B62D 1/16; F16D 9/06; Y10T 403/11
USPC .................. 280/777; 74/492; 180/78; 403/2; 464/162, 32
See application file for complete search history.

(56) References Cited

U.S. PATENT DOCUMENTS

| | | | | |
|---|---|---|---|---|
| 881,075 | A | * 3/1908 | Hosking | .................. B23G 1/46 |
| | | | | 279/157 |
| 3,472,093 | A | * 10/1969 | Tenniswood | ........... B62D 1/192 |
| | | | | 180/271 |
| 3,960,031 | A | * 6/1976 | Chometon | ............. B62D 1/192 |
| | | | | 188/376 |
| 4,133,220 | A | 1/1979 | Wenninger | |
| 4,718,296 | A | * 1/1988 | Hyodo | .................... B62D 1/192 |
| | | | | 188/371 |
| 5,201,545 | A | 4/1993 | Boersma | |
| 5,336,013 | A | 8/1994 | Duffy et al. | |
| 5,380,040 | A | 1/1995 | Perichon | |

FOREIGN PATENT DOCUMENTS

| | | |
|---|---|---|
| DE | 10105634 A1 | 8/2002 |
| EP | 1395479 B1 | 1/2007 |
| GB | 2464490 A | 4/2010 |
| JP | 2812165 B2 * | 10/1998 |

(Continued)

OTHER PUBLICATIONS

Search Report dated May 3, 2017 for Great Britain Patent Application No. GB 1618771.8.

*Primary Examiner* — Keith J Frisby
(74) *Attorney, Agent, or Firm* — James P. Muraff; Neal Gerber & Eisenberg LLP

(57) ABSTRACT

Various embodiments of the present disclosure provide an energy absorbing steering column assembly with a J-shaped lower intermediate shaft that is coupled to an upper intermediate shaft. The J-shaped lower shaft includes a curved "slider" portion that fits within a bent portion of the upper shaft such that even when the rigid connection between the J-shaped lower shaft and the upper shaft is broken, the slider portion of the J-shaped lower shaft remains in contact with the upper shaft. Such a configuration enables the driver to maintain control of the vehicle through the steering wheel.

20 Claims, 5 Drawing Sheets

(56) References Cited

FOREIGN PATENT DOCUMENTS

| | | | |
|---|---|---|---|
| JP | 11287237 A | * | 10/1999 |
| JP | 3389767 B | | 3/2003 |
| WO | WO 00/76833 A1 | | 12/2000 |

* cited by examiner

--Prior Art--

--Prior Art--

--Prior Art--

--Prior Art--

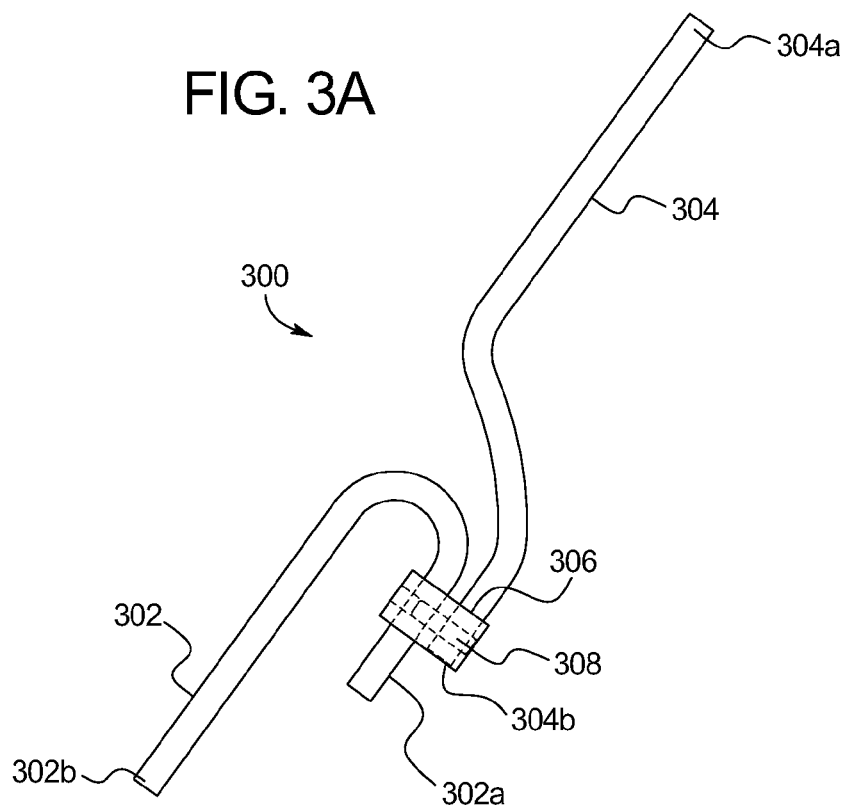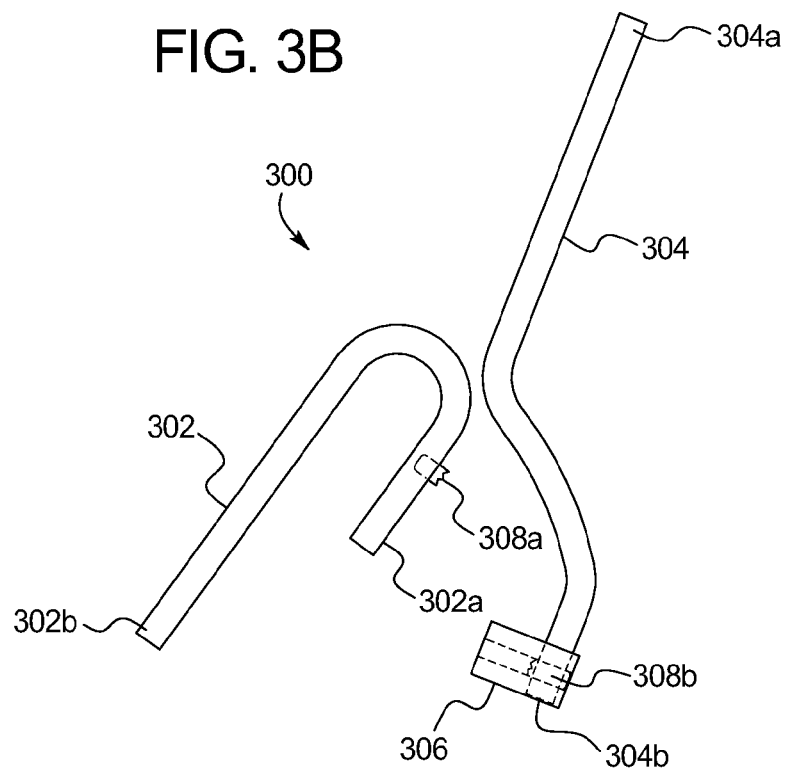

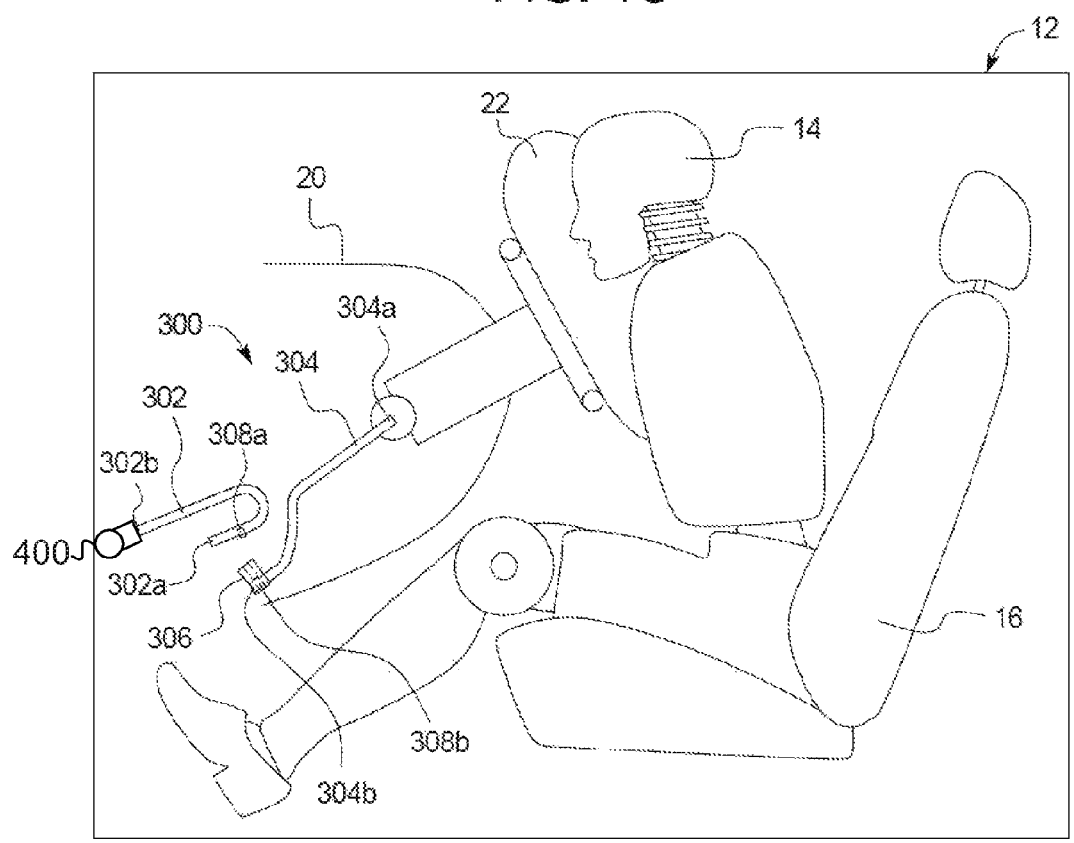

STEERING COLUMN WITH DECOUPLING J-SLIDER

TECHNICAL FIELD

This application generally relates to a vehicle steering column assembly with a decoupling J-shaped intermediate shaft to provide an improved energy absorbing steering column to enhance frontal impact performance of a vehicle.

BACKGROUND

The Federal Motor Vehicle Safety Standard No. 208 (FMVSS208) is a safety standard issued by the National Highway Traffic Safety Administration to measure how well a passenger vehicle would protect its occupant in the event of a frontal load event (such as a frontal crash). To meet the driver federal FMVSS208 test requirements and to meet public domain corporate objectives for occupant safety, it is essential to provide and maintain an effective steering column energy management system.

When a forwardly directed impact load is imposed upon the steering wheel, one of the functions of the steering column is to dissipate the energy of an impact load directed against the steering wheel. Installation of an energy-absorbing steering column decreases rearward displacement. If a steering column absorbs the impact, it lessens the severity of driver injuries. A typical steering column assembly includes an intermediate shaft that is connected to a steering wheel at one end and a steering gear assembly at the opposite end. During a load event (such as a frontal impact), the steering column is pushed downward in response to a force from the load event. Sometimes, due to a limited length of the intermediate shaft, an impulse load is transmitted back (rearward) through the steering column and back to the steering wheel. The steering wheel may be pushed towards the driver upon impact, transmitting excessive force into the driver's head and\or chest.

Existing solutions include a decoupling (breakaway) intermediate shaft that is implemented to overcome these issues. More specifically, upon encountering a load event, a lower portion of the intermediate shaft decouples from an upper portion of the intermediate shaft, thereby preventing the upper portion of the intermediate shaft from bottoming out and sending a rearward impulse force back through the steering column. With the upper portion (connected to the steering wheel) decoupled from the lower portion (connected to the steering gear assembly), the driver is no longer capable of controlling the vehicle with the steering wheel. This is a problem if the lower shaft decouples from the upper shaft during a mild load event, such as during normal or off road driving conditions.

Accordingly, there is a need for a solution to these problems. This invention disclosure attempts to overcome the concerns of the "standard" original decoupling design with an enhanced concept.

SUMMARY

Various embodiments of the present disclosure provide an energy absorbing steering column assembly with a J-shaped lower intermediate shaft that is coupled to an upper intermediate shaft. The J-shaped lower shaft ("J-slider") includes a curved "slider" portion that fits within a bent portion of the upper shaft such that even when the rigid connection between the J-shaped lower shaft and the upper shaft is broken, the slider portion of the J-shaped lower shaft remains in contact with the upper shaft. Such a configuration enables the driver to maintain control of the vehicle through the steering wheel.

More specifically, in operation, the J-shaped lower shaft has two stages of responses for a load event (such as a frontal impact). In the first stage, in response to a force greater than a first predetermined minimum force, (such as one that occurs during off road driving), the J-slider shaft breaks its rigid connection with the upper shaft but still maintains geometric contact with the upper shaft so as to maintain vehicle control through the steering wheel. In the second stage, in response to force greater than a second predetermined minimum force (which is greater than the first predetermined minimum force), the J-slider shaft breaks its rigid connection with the upper shaft and completely decouples from the upper shaft so that the upper shaft can absorb the energy of the extreme force without transmitting a rearward force back to the driver.

Such a configuration provides a steering column that effectively dissipates the force applied to the steering column while still maintaining control of the vehicle.

As will be appreciated, this disclosure is defined by the appended claims. The description summarizes aspects of the embodiments and should not be used to limit the claims. Other implementations are contemplated in accordance with the techniques described herein, as will be apparent to one having ordinary skill in the art upon examination of the following drawings and detail description, and such implementations are intended to be within the scope of this application.

BRIEF DESCRIPTION OF THE DRAWINGS

For a better understanding of the invention, reference may be made to embodiments shown in the following drawings. The components in the drawings are not necessarily to scale and related elements may be omitted, or in some instances proportions may have been exaggerated, so as to emphasize and clearly illustrate the novel features described herein. In addition, system components can be variously arranged, as known in the art. Further, in the drawings, like reference numerals designate corresponding parts throughout the several views.

FIGS. 3A-3B illustrate a steering assembly of the present disclosure in accordance with certain embodiments.

FIGS. 4A-4C are a side view of an exemplary vehicle depicting a steering assembly of the present disclosure, in accordance with certain embodiments.

DETAILED DESCRIPTION OF EXAMPLE EMBODIMENTS

Figure 1A:
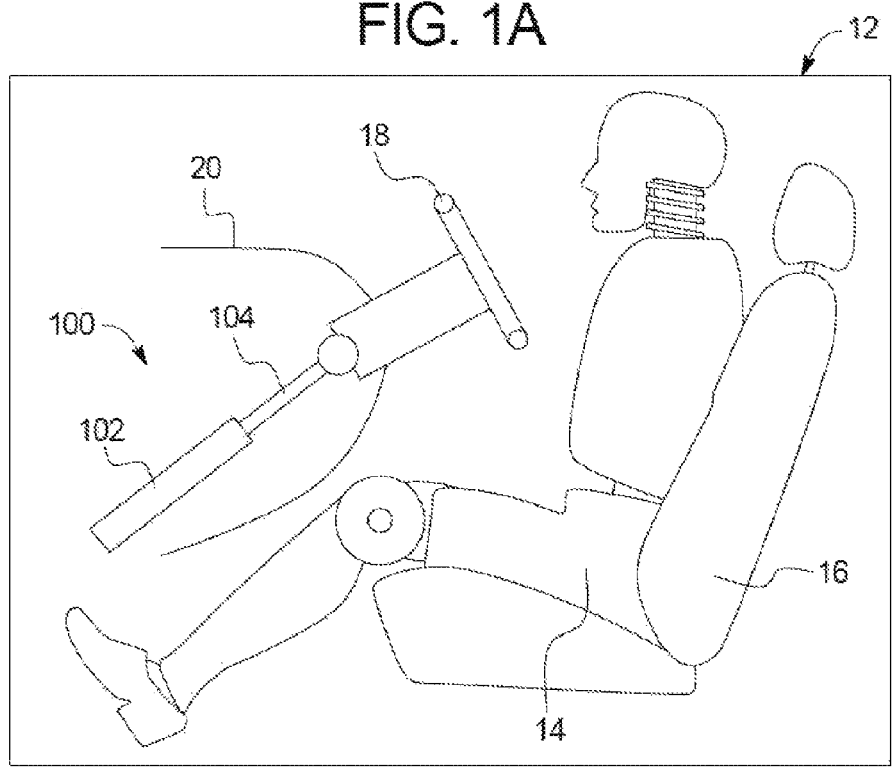
FIGS. 1A-1B are a side view of an exemplary vehicle depicting an example of a steering assembly including a standard intermediate shaft of the prior art.

While the invention may be embodied in various forms, there are shown in the drawings, and will hereinafter be described, some exemplary and non-limiting embodiments, with the understanding that the present disclosure is to be considered an exemplification of the invention and is not intended to limit the invention to the specific embodiments illustrated.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects.

Various embodiments of the present disclosure provide an energy absorbing steering column assembly with a J-shaped lower intermediate shaft ("J-slider") that is coupled to an upper intermediate shaft. The J-slider shaft includes a curved "slider" portion that fits within a bent portion of the upper shaft such that even when the rigid connection between the J-slider shaft and the upper shaft is broken, the slider portion of the J-slider shaft remains in contact with the upper shaft. Such a configuration enables the driver to maintain control of the vehicle through the steering wheel.

In operation, the J-slider shaft has two stages of responses for a load event (such as a frontal impact). In the first stage, in response to a force that is greater than a first predetermined minimum force, (such as one that occurs during off road driving), the J-shaped lower shaft breaks its rigid connection with the upper shaft but still maintains geometric contact with the upper shaft so as to maintain vehicle control through the steering wheel. In the second stage, in response to a force greater than a second predetermined minimum force (which is greater than the first predetermined minimum force), the J-shaped lower shaft breaks its rigid connection with the upper shaft and completely decouples from the upper shaft so that the upper shaft can absorb the energy of the extreme force without transmitting a rearward force back to the driver. Such a configuration provides a steering column that effectively dissipates the force applied to the steering column while still maintaining control of the vehicle.

FIG. 1A illustrates an example of a prior art steering column assembly 100 with a standard intermediate shaft. More specifically, FIG. 1A illustrates an interior of a vehicle cabin area 12. The illustrated embodiment shows a driver side of the vehicle, wherein the front-seat occupant 14 is a driver of the vehicle and the front seat 16 is a driver's seat. Further, it should be appreciated that the vehicle may be any type of motor vehicle, including, but not limited to, a sedan, a sports utility vehicle (SUV), minivan, van, truck, station wagon, etc. In some cases, the dashboard 20 can be considered to include the steering column assembly 100 and/or the steering wheel 18 extending therefrom.

In certain frontal load events, an impact can cause an intrusion into the cabin area 12, resulting in forward movement of the front-seat occupant 14 toward the dashboard 20. In some cases, the load event may also cause rearward and/or lateral movement of the dashboard 20 or other compartment of the vehicle 10 (e.g., the steering column 24, the steering wheel 22, outboard compartments, inboard compartments, etc.).

The steering column assembly 100 of this prior art embodiment includes a standard intermediate shaft that includes an upper intermediate shaft portion 104 connected to a lower intermediate shaft portion 102. As illustrated, a first end of the upper shaft portion 104 is operatively connected to a steering wheel 18. A second end of the upper shaft portion 104 is connected to an upper end of the lower shaft portion 102. A second lower end of the intermediate shaft 102 is connected to a steering gear assembly (not shown) that controls the front wheels of the vehicle. Thus the lower shaft and the upper shaft provide a direct connection between the steering wheel 18 and the steering gear assembly (not shown).

Figure 1B:
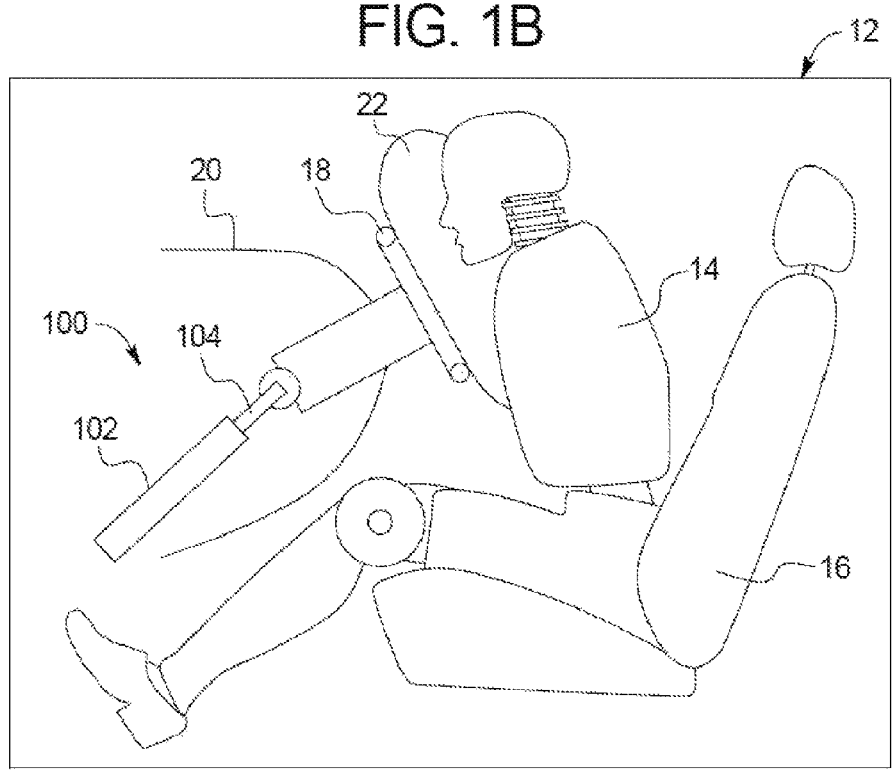

FIG. 1B illustrates the operation of the steering column assembly 100 during a load event. During a load event, the force of the load event may cause the driver 14 to push forward and push down on the upper shaft 104, which in turn pushes down on the lower shaft 102. The upper shaft 104 coaxially fits into the lower shaft 102 and travels down the length of the lower shaft 102. If there is not enough distance along the lower shaft 102 for the upper shaft 104 to travel, the upper shaft hits the bottom of the lower shaft 102, or bottoms out. In the event of the upper shaft bottoming out, an impulse force is sent back (rearward) into the steering column resulting in a return force back onto the driver, and particularly to the driver's head and/or chest.

Another issue with this prior art steering column assembly 100 is that even with enough travel along the intermediate shaft, the tube-in-tube design may become bound up due to friction or side loads or misalignment. For example, if the intermediate shaft is compressed from the sides by a component in the engine or the occupant compartment, the intermediate shaft may become bound up. Like the limited intermediate shaft travel, the intermediate shaft binding up sends an impulse force back into the column transmitting excessive force into the driver's head and/or chest when they are trying to "ride down" the column like a shock absorber.

Thus, there is a need to provide an energy management system for the steering column assembly that better absorbs the force from load events that cause such frontal impacts.

Figure 2A:
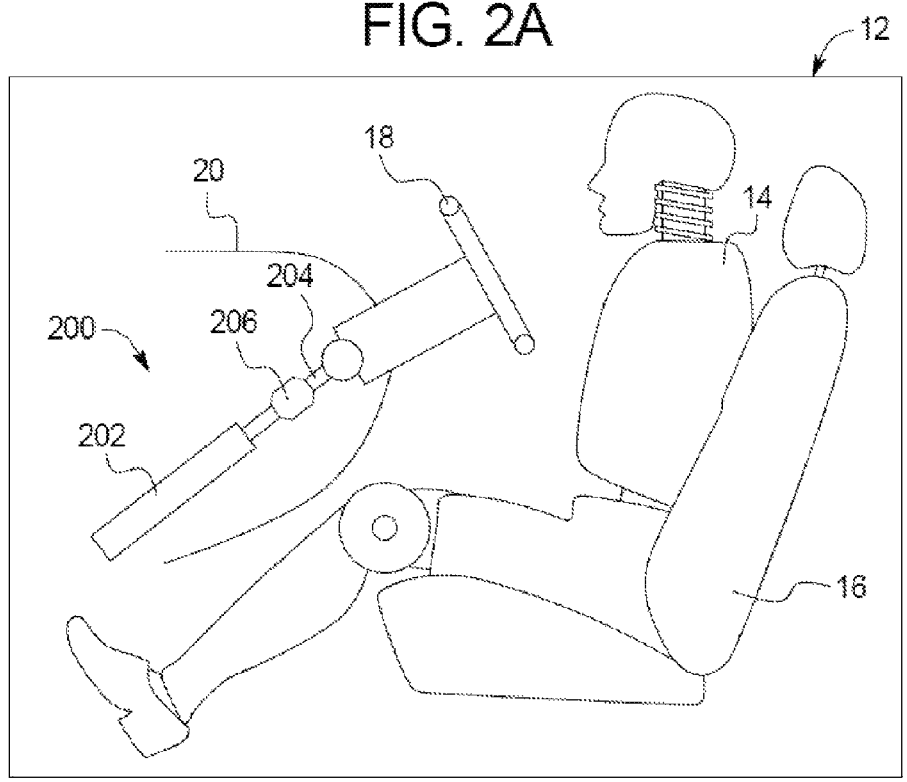
FIGS. 2A-2B are a side view of an exemplary vehicle depicting an example of a steering assembly including a decoupling intermediate shaft of the prior art.
Figure 2B:
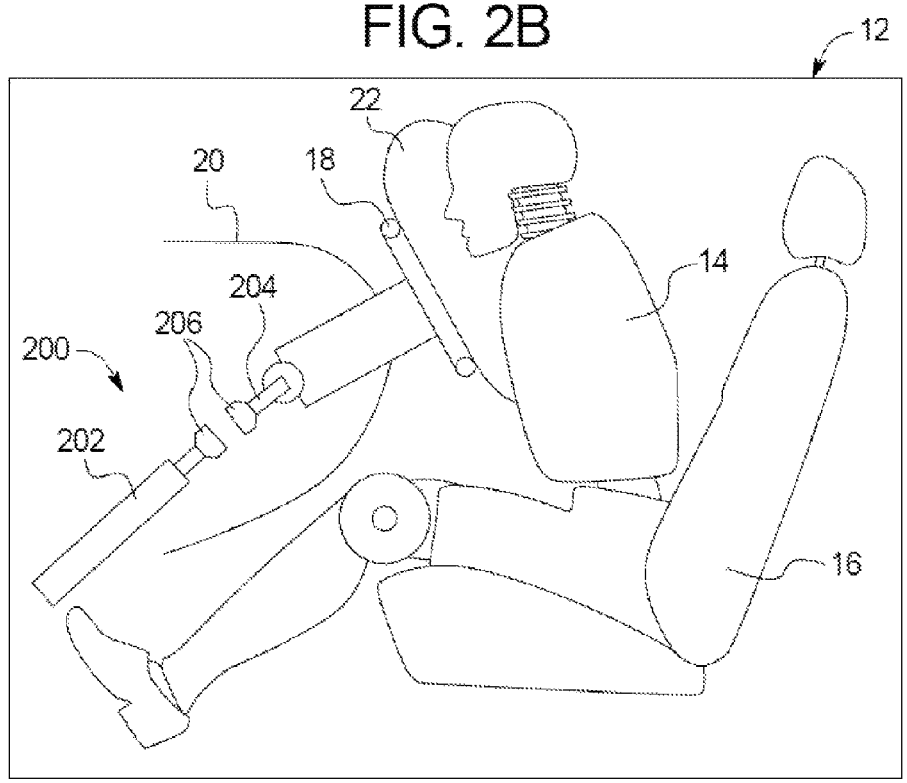

FIGS. 2A and 2B illustrate one existing solution to the problem described with respect to FIGS. 1A and 1B. The steering column assembly 200 illustrated in FIGS. 2A and 2B includes a decoupling intermediate shaft with an upper shaft 204 and a lower shaft 202. The upper end of the upper shaft 204 is connected to the steering wheel 18. The lower end of the upper shaft 204 is connected to the lower shaft 202 by a coupling assembly 206. More specifically, the lower end of the upper shaft 204 is attached to a coupling assembly 206 and an upper end of the lower shaft 202 is attached to the same coupling assembly 206. The lower end of the lower shaft 202 is connected to a steering gear assembly (not shown).

In one embodiment, the coupling assembly includes a first cavity for receiving the upper shaft and a second cavity for receiving the lower shaft. The coupling assembly is configured to decouple (i.e., break apart) when there is not enough space for travel. For example, FIG. 2B illustrates the steering column assembly 200 during a load event. As illustrated, when a load event causes the driver to move into the steering wheel, the driver 14 pushes down on the steering wheel and the upper shaft 204 is pushed towards the lower shaft 202. In this prior art embodiment, under a predetermined minimum force, the lower shaft 202 decouples from (i.e., breaks away from) the upper shaft 204. By breaking away, the lower shaft 202 does not send a rearward force back up the upper shaft 204. As such, the rear force exerted back towards the driver is significantly reduced.

One problem with this solution is that when the lower shaft 202 breaks apart from the upper shaft 204, the driver loses control of the vehicle. More specifically, when the lower shaft 202 breaks away from the upper shaft 204, the steering wheel 18 is no longer connected to the steering gear assembly (not shown). Thus, the driver no longer retains control of the vehicle with the steering wheel. In the event of an extreme load event, this issue may not be relevant as the vehicle will likely be stopped. However, it is possible for the lower shaft 202 to break away from the upper shaft 204 during normal driving or during off road driving. More specifically, the predetermined minimum force under which the lower shaft 202 breaks away from the upper shaft 204 may occur during normal driving conditions. Such a configuration presents a problem since the driver of the vehicle would not be able to control the vehicle using the steering wheel.

One of the existing solutions for this problem is to add a wire between the upper shaft and the lower shaft to maintain a connection between the lower shaft and the upper shaft. However, this solution falls short because depending on the load event, there may not be enough wire to hold the lower shaft to the upper shaft sufficiently.

Various embodiments of the present disclosure include a steering column assembly 300 that includes a "J" shaped lower shaft ("J-slider shaft") coupled to an upper shaft. FIG. 3A illustrates the steering assembly 300 including the J-slider shaft 302 coupled to the upper shaft 304. The upper shaft 304 includes a first end 304a operatively connected to the steering wheel 18 and a second end 304b opposite the first end 304a attached to a coupling assembly 306.

The J-slider shaft 302 is shaped like the letter "J" or like a hook. The J-slider 302 includes a first end 302a, which is coupled to the second end 304b of the upper shaft 304 by a coupling assembly 306. More specifically, the first end 302a slides into the coupling assembly 306, which is attached to the second end 304b of the upper shaft 304. The J-slider shaft 302 curves from the first end 302a to a second end 302b, which is operatively connected to a steering rack (not shown).

The upper shaft 304 is bent to fit the "J" shape of the j-slider lower shaft 302. That is, when the upper shaft 304 is coupled to the J-slider shaft 302, the upper portion of the upper shaft 304 is aligned with the lower longer straight portion of the J-slider shaft 302, as depicted in FIG. 3A. The upper shaft 304 is bent to accommodate the curved portion of the J-slider lower shaft 302 such that around the curve, the shorter straight portion of the lower J-slider 302 is adjacent to the lower portion of the upper shaft 304. Accordingly, when the upper shaft 304 and the lower J-slider shaft 302 are coupled together, the lower end 304b of the upper shaft 304 is adjacent to the first end 302a of the J-slider shaft 302 and the upper end 304a of the upper shaft 304 is in line with the second end 302b of the J-slider shaft 302.

A coupling assembly 306 is attached to the second end 304b of the upper shaft 304. In one embodiment, the coupling assembly 306 includes a first cavity to retain the upper shaft 304 and a second cavity to retain the lower J-slider shaft 302. More specifically, the first cavity of the coupling assembly 306 is fixed to the lower end 304b of the upper shaft 304. The second cavity of the coupling assembly 306 is removably attached to the first end 302a of the J-slider shaft such that the J-slider shaft 302 is capable of sliding into and out of the coupling assembly 306.

In addition to the coupling assembly 306, the upper shaft 304 and the J-slider shaft 302 are connected together by a shear pin 308. The shear pin 308 provides a rigid connection between the upper shaft 304 and the J-slider 302 shaft. It should be appreciated that in response to a load event, the shear pin 308 is the first to break.

Turning to FIG. 3B, which illustrates the J-slider shaft 302 completely separated from the upper shaft 304. It should be appreciated that for the upper shaft 304 to become completely separated from the J-slider lower shaft 302, two things have to happen. First, the shear pin 308 must break. Second, the J-slider shaft must slide out of the coupling assembly 306. That is, even after the shear pin 308 breaks, the J-slider does not immediately detach from the upper intermediate shaft 304. Thus, if due to normal or off road driving conditions the slider\coupled portion loses its rigid connection (i.e. the shear pin breaks) with the other end of the shaft, the sliding portion will still geometrically be in contact (locked in) with the upper shaft. This will allow for continued steering control of the vehicle, putting the driver at no risk.

Figure 4A:
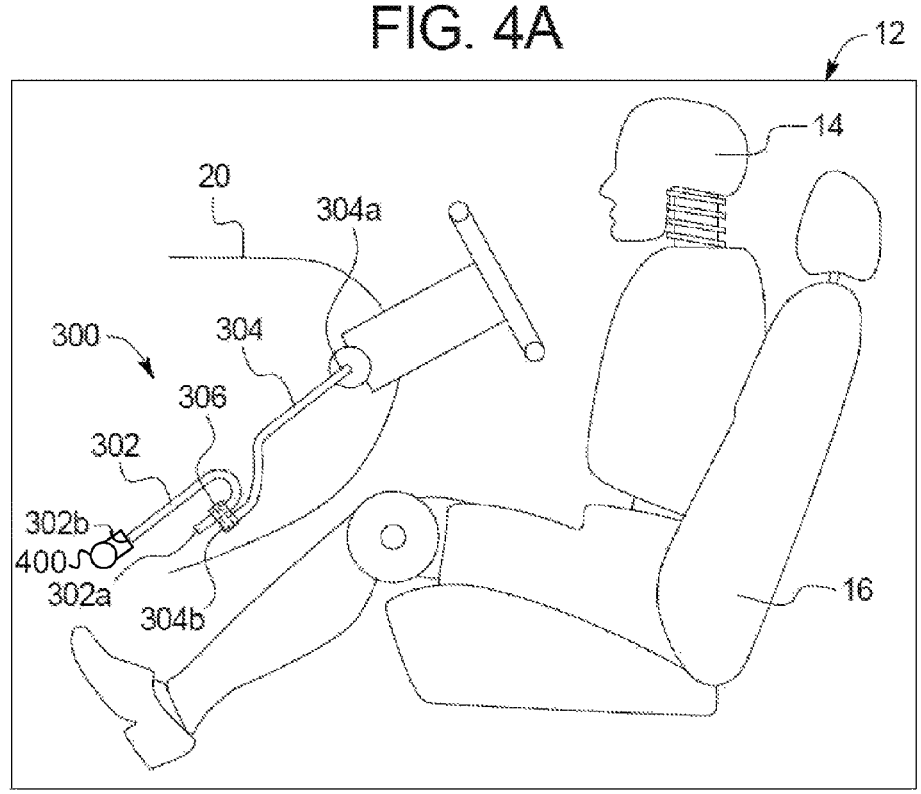
Figure 4B:
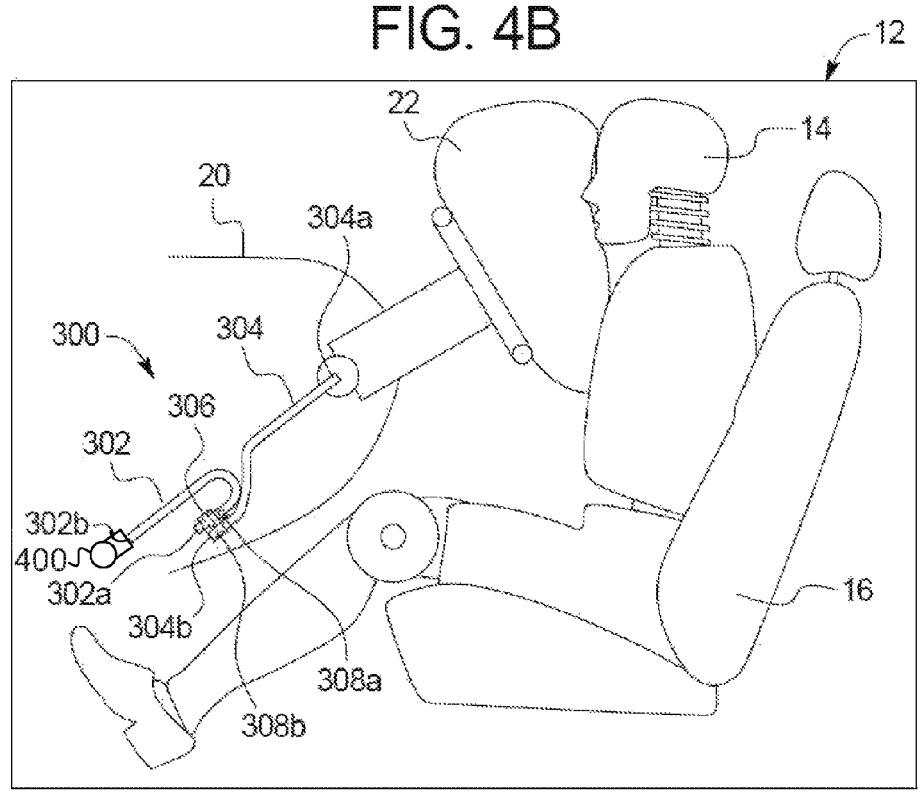

Referring to FIGS. 4A to 4C, the steering column assembly 300 with a J-slider intermediate shaft of the present disclosure provides a steering column energy management system with two stages of response to a load event. FIG. 4A depicts the steering column assembly 300 prior to a load event. FIG. 4B depicts the first stage of response to a minor load event, such as a load event that occurs during off road driving. FIG. 4C depicts the second state of response to a major load event.

Turing to FIG. 4A, as illustrated, the upper end of the upper shaft 304 is connected to the steering wheel 18 and the lower end of the upper shaft 304 is attached to the coupling assembly 306. The first end 302a of the J-slider shaft 302 slides into the coupling assembly 306 such that the first end 302a completely clears and protrudes from the coupling assembly 306.

When a load event occurs that causes a force to be applied to the steering column, the steering assembly 300 of the present disclosure includes two stages of responses to the load event. If the magnitude of the impact is less than a first predetermined minimum, the steering column remains unchanged and the load is supported by the coupled steering column. It should be appreciated that the minimum force that causes the shafts to decouple are determined by each manufacturer.

On the other hand, if the magnitude of the impact is greater than the first predetermined minimum load, the steering column assembly 300 of the present disclosure enters the first stage of response. In the first stage of response, the J-slider shaft 302 breaks its rigid connection with the upper shaft 304, but maintains geometric contact with the upper shaft 304 so that the steering wheel 18 remains in contact with the steering gear assembly 400. If the steering column experiences an impact from a major load event, and the magnitude of the impact is greater than a second predetermined minimum load, the steering column assembly 300 of the present disclosure enters a second stage of response. In the second stage of response, the J-slider shaft 302 slides out of the coupling assembly 306 and completely decouples from the upper shaft 304. It should be appreciated that due to the shape of the J-slider shaft, the steering column would rarely have cause to enter the second stage of response.

FIG. 4B illustrates the first stage of response to a minor load event, such as a load event that occurs while off road driving. In the first stage, in response to a first predetermined minimum force (such as one that occurs during off road driving), which causes a downward force on the upper shaft 304, the J-slider shaft 302 breaks its rigid connection with the upper shaft 304. More specifically, the shear pin 308 fractures to permit forward displacement of the upper shaft 304. In this embodiment, as illustrated in FIG. 4B, a portion of the shear pin 308a remains attached to the J-slider lower shaft 302, and a portion of the shear pin 308b remains attached to the upper shaft 304. It should be appreciated that in alternative embodiments, the shear pin may be attached to the upper shaft 304 and the J-slider shaft 302 in a different manner.

As depicted in FIG. 4B, even after the J-slider lower shaft 302 breaks its rigid connection with the upper shaft 304, the J-slider shaft 302 still maintains geometric contact with the upper shaft 304 so as to maintain vehicle control through the steering wheel. The movement of the upper shaft 304 causes the J-slider shaft 302 to slide slightly out of the coupling assembly 306. However, the bent shape of the upper shaft 304 and the curved portion of the J-slider shaft 302 maintain contact. As shown in FIG. 4B, there is a shorter portion of the first end 302a of the J-slider shaft 302 protruding from the coupling assembly 306 than in FIG. 4A indicating that the J-slider shaft 302 and the upper shaft 304 are still coupled together.

The breaking of the shear pin allows the upper shaft to break away slightly from the J-slider to prevent from any rearward impulse being transmitted back through the steering column and to the driver. On the other hand, the shape of the J-slider lower shaft enables the J-slider shaft to remain geometrically coupled to the upper shaft so that the driver maintains control of the vehicle.

It should be appreciated that in this stage, the driver would notice a certain level of rattle\nibble in the steering system due to the breaking of the shear pin (and in turn the breaking of the rigid connection between the upper shaft and the J-slider). The driver could have the vehicle serviced to replace the shear pin as a precautionary measure.

FIG. 4C illustrates the second stage of response by the steering column assembly 300 of the present disclosure. In the second stage, in response to a second predetermined minimum force (which is greater than the first predetermined minimum force), the J-shaped lower shaft breaks its rigid connection with the upper shaft and completely decouples from the upper shaft completely so that the upper shaft can absorb the energy of the extreme force without transmitting a rearward force back to the driver. More specifically, if the load event results in a force that is greater than a second predetermined minimum amount, the shear pin 308 fractures and the J-slider shaft 302 slides completely out of the coupling assembly 306.

It should be appreciated that the J-shape of the J-slider shaft permits significantly more travel distance for the upper shaft than the prior art steering assemblies. The J-slider shaft must slide completely out of the coupling device before the vehicle loses steering control. As such, the design of the J-slider shaft provides more travel for the upper shaft to dissipate the energy received from the impact of a load event, while safely maintaining control of the steering capabilities of the vehicle.

It should be emphasized that the above-described embodiments, particularly, any "preferred" embodiments, are possible examples of implementations, merely set forth for a clear understanding of the principles of the invention. Many variations and modifications may be made to the above-described embodiment(s) without substantially departing from the spirit and principles of the techniques described herein. All such modifications are intended to be included herein within the scope of this disclosure and protected by the following claims. This includes any alternate implementations of the processes or methods shown in the figures in which functions may be executed out of order from that shown or discussed, including substantially concurrently or in reverse order, depending on the functionality involved, as would be understood by those having ordinary skill in the art.

The invention claimed is:

1. A vehicle steering column assembly, comprising:
   an upper shaft,
   a J-shaped lower shaft;
   a coupling assembly coupling the upper shaft to the lower shaft; and
   a shear pin connecting the upper shaft to the lower shaft, wherein the shear pin breaks when a first predetermined minimum force is applied to the upper shaft;
   wherein the lower shaft remains coupled to the upper shaft after the shear pin breaks.

2. The vehicle steering column assembly of claim 1, wherein the upper shaft is connected to a steering wheel.

3. The vehicle steering column assembly of claim 1, wherein the lower shaft is connected to a steering gear assembly.

4. The vehicle steering column assembly of claim 1, wherein the upper shaft is bent such that a curved portion of the J-shaped lower shaft slides along the bent portion of the upper shaft.

5. The vehicle steering column assembly of claim 1, wherein the coupling assembly is attached to a lower end of the upper shaft.

6. The vehicle steering column assembly of claim 5, wherein to couple the upper shaft to the lower shaft, a first end of the lower shaft slides into the coupling assembly.

7. The vehicle steering column assembly of claim 6, wherein for the lower shaft to decouple from the upper shaft, the lower shaft must slide completely out of the coupling assembly.

8. An intermediate shaft, comprising:
   an upper shaft attached to a first cavity of a coupling assembly,
   a J-shaped lower shaft having a first end that slides into a second cavity of the coupling assembly to couple the lower shaft to the upper shaft, and
   a shear pin fastening the upper shaft to the lower shaft, the shear pin configured to break when a first predetermined minimum force is applied to a steering assembly.

9. The intermediate shaft of claim 8, wherein the upper shaft is connected to a steering wheel.

10. The intermediate shaft of claim 9, wherein the lower shaft is connected to a steering gear assembly.

11. The intermediate shaft of claim 8, wherein a steering wheel maintains control of a steering gear assembly as long as the lower shaft remains coupled to the upper shaft.

12. The intermediate shaft of claim 8, wherein the lower shaft remains coupled to the upper shaft when the shear pin breaks.

13. The intermediate shaft of claim 8, wherein the lower shaft slides out of the second cavity of the coupling assembly when a second predetermined minimum force is applied to the steering assembly.

14. The intermediate shaft of claim 8, wherein the upper shaft is bent such that a curved portion of the J-shaped lower shaft slides along the bent portion of the upper shaft.

15. A coupling assembly comprising:
   a first cavity sized to fit around a first end of an upper shaft;
   a second cavity sized to fit around a first end of a J-shaped lower shaft;
   wherein the coupling assembly is attached to the first end of the upper shaft, the first end of the J-shaped lower shaft slides into the second cavity of the coupling assembly, and the upper shaft is bent such that a curved portion of the J-shaped lower shaft slides along the bent portion of the upper shaft.

16. The coupling assembly of claim 15, wherein a shear pin connects the upper shaft to the lower shaft.

17. The coupling assembly of claim 16, wherein the shear pin breaks when a first predetermined minimum force is applied to a steering assembly.

18. The coupling assembly of claim 17, wherein the lower shaft remains coupled to the upper shaft when the shear pin breaks.

19. The coupling assembly of claim 15, wherein the upper shaft is connected to a steering wheel.

20. The coupling assembly of claim 15, wherein the lower shaft is connected to a steering gear assembly.

\* \* \* \* \*